United States Patent
Kashiwazaki et al.

(10) Patent No.: US 6,860,593 B2
(45) Date of Patent: Mar. 1, 2005

(54) INK-JET INK, INK SET, METHOD FOR INK-JET PRINTING, INK-JET PRINTING APPARATUS, INK-JET PRINTING UNIT AND INK CARTRIDGE

(75) Inventors: Akio Kashiwazaki, Kanagawa (JP); Katsuhiro Shirota, Kanagawa (JP); Akihiro Mouri, Tokyo (JP); Noribumi Koitabashi, Kanagawa (JP); Hitoshi Tsuboi, Tokyo (JP); Yasunori Fujimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 10/241,567

(22) Filed: Sep. 12, 2002

(65) Prior Publication Data

US 2003/0048342 A1 Mar. 13, 2003

Related U.S. Application Data

(62) Division of application No. 09/884,094, filed on Jun. 20, 2001, now Pat. No. 6,540,344.

(30) Foreign Application Priority Data

Jun. 21, 2000 (JP) ........................................ 2000-187015
Jun. 20, 2001 (JP) ........................................ 2001-186689

(51) Int. Cl.$^7$ ................................................ B41J 2/01
(52) U.S. Cl. ...................... 347/100; 347/95; 106/31.13; 106/31.6
(58) Field of Search ............................. 347/100, 96, 95, 347/98, 97, 101; 106/31.13, 31.6, 31.26, 31.27

(56) References Cited

U.S. PATENT DOCUMENTS

| | | | | |
|---|---|---|---|---|
| 4,490,177 | A | * 12/1984 | Shioi et al. | 106/31.65 |
| 5,734,403 | A | 3/1998 | Suga et al. | 347/100 |
| 5,938,827 | A | 8/1999 | Breton et al. | 106/31.58 |
| 6,011,098 | A | 1/2000 | Kashiwazaki et al. | 524/377 |
| 6,114,411 | A | * 9/2000 | Nakamura et al. | 523/161 |
| 6,247,808 | B1 | * 6/2001 | Ma et al. | 347/100 |
| 6,387,168 | B1 | 5/2002 | Koitabashi et al. | 106/31.6 |
| 6,435,677 | B1 | 8/2002 | Koitabashi et al. | 347/96 |
| 6,440,203 | B2 | * 8/2002 | Kato | 106/31.6 |

FOREIGN PATENT DOCUMENTS

| | | | |
|---|---|---|---|
| EP | 0879857 A2 * | 5/1998 | ............ C09D/11/00 |
| EP | 0879857 A2 * | 11/1998 | ............ B41J/2/01 |
| EP | 0 913 438 A1 | 5/1999 | |
| EP | 0 997 506 A2 | 5/2000 | |
| EP | 1 153 991 A1 | 11/2001 | |

* cited by examiner

Primary Examiner—Stephen D. Meier
Assistant Examiner—Manish Shah
(74) Attorney, Agent, or Firm—Fitzpatrick, Cella, Harper & Scinto

(57) ABSTRACT

An ink which includes a first pigment, a second pigment, a polymer dispersant and an aqueous medium; wherein the first pigment is a self-dispersing pigment having on its surface at least one anionic group bonded to the surface directly or via an atomic group, the second pigment is dispersed in the aqueous medium by the polymer dispersant, and the polymer dispersant contains benzylmethacrylate as a monomer unit. Diffusion of this ink in the printing medium is suppressed in the cross-sectional direction but not horizontal direction. Thus, the ink can form an ink dot that has a proper dot size, uniform and high density in the dot, with little feathering or blur.

32 Claims, 8 Drawing Sheets

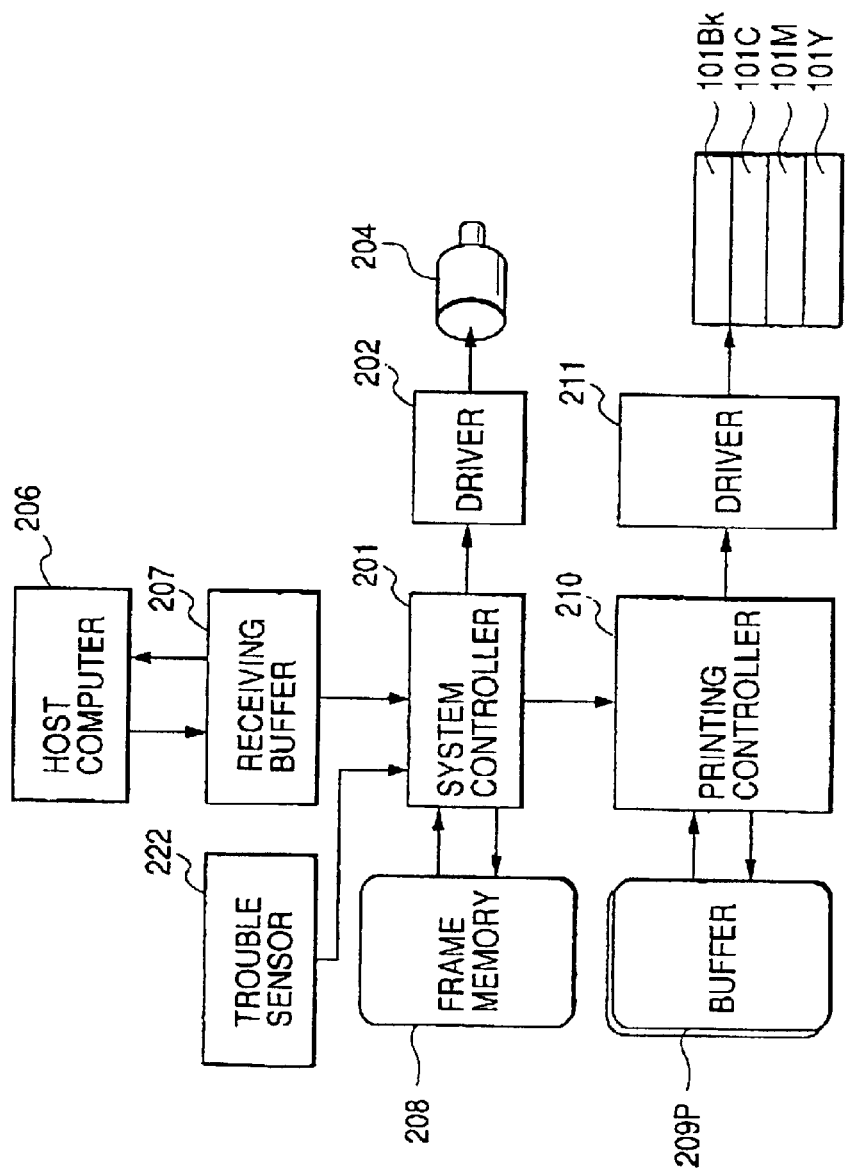

INK-JET INK, INK SET, METHOD FOR INK-JET PRINTING, INK-JET PRINTING APPARATUS, INK-JET PRINTING UNIT AND INK CARTRIDGE

This is a divisional application of application Ser. No. 09/884,094, filed Jun. 20, 2001, now U.S. Pat. No. 6,540,344.

BACKGROUND OF THE INVENTION

1. Field of the Invention

The present invention relates to an ink-jet ink and an ink-jet printing method. It also relates to an ink set, ink cartridge, printing unit and Ink-jet printing apparatus. The present invention is applicable for any apparatus that can print on a printing medium such as printing paper, cloth, leather, OHP paper and nonwoven fabric, especially applicable to business equipments such as printers, copiers and facsimiles utilizing ink-jet printing process.

2. Related Background Art

The Ink-jet printing method has various advantages including low noise operation, low running cost, high-speed printing, and easy adaptation for down-sizing and for color printing. Thus, ink-jet printing is widely employed for printers, copying machines, or the like. In general, the ink employed for printers is selected in consideration of its printing properties such as ejecting properties and fixing properties and print qualities such as bleeding, optical reflection density, and coloring of the printed images.

As is well known, inks are divided into two types according to the coloring material contained in the ink, i.e., the dye ink and the pigment ink. The pigment ink has various advantages in comparison with the dye ink, such as superior water resistance and light fastness, and clear character printing.

The pigment in a pigment ink is generally stably dispersed in the ink by the electric repulsion force of the polymer dispersant which destroys the agglomeration of the pigment particles due to intermolecular force. Therefore, it is preferable to add a polymer dispersant to an ink in an amount according to the amount of the pigment.

When such a pigment ink is applied onto a recording medium such as plain paper by an ink-jet printing process for printing characters, the solvent, e.g. water, of the ink penetrates into the paper and evaporates into the ambient air, and the pigment particles agglomerate. In this case, the more a polymer dispersant is added, the stronger the agglomeration force of the ink on the paper becomes. Thus, when an Ink dot is formed on a paper sheet with a prescribed volume of the ink ejected from an ink-jet head, the diameter of the dot is small and the dot shape remains irregular due to the impact of landing on the paper. Therefore, in order to obtain an ink dot having a sufficient printing density and a dot size necessary for forming a printing image free from white stripes or other similar defects, the ejection volume of an ink from an ink-jet head must be adjusted rather high. Even with such an adjustment, the presence of a polymer dispersant in a pigment ink, in combination with the penetrability decrease of the ink due to the strong agglomeration force of the pigment particles adsorbed on the dispersant, may delay the fixation of a pigment ink on a printing medium or lower the rub-off resistance of the recorded image.

In order to make the dot size larger and to improve the fixation properties, a penetrant may be added to a pigment ink to enhance penetration of the ink into a printing medium. However, use of a penetrant may cause undesirable phenomena such as the irregular peripheral shape of the dot (feathering), and penetration of the ink to the back of the printing medium (back-through), which are undesirable for the high quality recorded image. Further, since the coloring material penetrates into the printing medium, it often occurs that the optical density (OD) of the ink dot is not so much increased as the dot size increases.

To solve such problems, inks containing a self-dispersing pigment have been proposed. Such an ink can provide dots of a larger size, since the pigment agglomeration force on the paper is weaker than that in conventional pigment inks in which the pigment is dispersed by a dispersant. It, however, is not sufficient yet.

As mentioned above, there is still much to study so as to develop a printing ink that satisfies various factors that affect the quality of printing such as fixability of the ink, enlargement of the ink dot size, uniform density in an ink dot, and high optical density of the ink itself, and further satisfies stability as an ink, especially ejection stability as an ink-jet ink. The same is said for the printing method.

SUMMARY OF THE INVENTION

An object of the present invention is to provide an ink characterized in that, a droplet of the ink applied onto the printing medium penetrates appropriately into the printing medium in a direction along the surface of the printing medium, but penetrates in a suppressed manner in a direction of the printing medium thickness, to give an ink dot formed on the printing medium having a proper size, high and uniform image density and excellent shape almost free from blur or feathering, and besides, the ink does not easily stick to the orifice area of the printing head of the ink-jet printing apparatus if the orifice area is water repellent.

Another object of the present invention is to provide an ink-jet printing method characterized in that an ink droplet applied onto the printing medium penetrates appropriately into the printing medium in a direction along the surface of the printing medium, but in a suppressed manner in a direction of the printing medium thickness, to give an ink dot formed on the printing medium having a proper size, high and uniform image density and excellent shape almost free from blur.

Still another object of the present invention is to provide an ink-jet printing method that can steadily form a high quality image of high image density with a reduced amount of ink.

Still another object of the present invention is to provide an ink-jet printing apparatus that can form a high quality image steadily, and also to provide a printing unit and an ink cartridge applicable to it.

Still another object of the present invention is to provide an ink-jet printing apparatus and an ink set usable for forming an image made from dots having a proper size, high and uniform image density and excellent shape almost free from blur.

According to one aspect of the present invention, there is provided an ink comprising a first pigment, a second pigment, a polymer dispersant and an aqueous medium;
  the first pigment being a self-dispersing pigment having on its surface at least one anionic group bonded to the surface directly or via an atomic group,
  the second pigment being dispersed in the aqueous medium by the polymer dispersant, and
  the polymer dispersant containing benzylmethacrylate as a monomer unit.

According to another aspect of the present invention, there is provided an ink comprising a first pigment, a second pigment, a polymer dispersant and an aqueous medium;

the first pigment being a self-dispersing pigment having on its surface at least one anionic group bonded to the surface directly or via an atomic group, the second pigment being dispersed in the aqueous medium by the polymer dispersant, and the second pigment has a BET specific surface area not higher than 300 m$^2$/g, and a DBP oil absorption not higher than 150 ml/100 g.

Both of the above mentioned inks can be used as an ink-jet ink.

According to still another aspect of the present invention, there is provided an ink-jet printing apparatus comprising an Ink-storing section containing an ink-jet ink as described above, and an ink-jet head to eject the ink.

According to still another aspect of the present invention, there is provided a printing unit comprising an ink-storing part containing an ink-jet ink as described above, and an ink-jet head to eject the ink.

According to still another aspect of the present invention, there is provided an ink cartridge comprising an ink-storing part containing an ink-jet ink as described above, wherein the cartridge is removable attached to an ink-jet head that ejects the ink, and supplies the ink to the ink-jet head when attached thereto. Another ink cartridge according to another embodiment of the invention comprises an ink-storing part containing one of the inks described above.

According to still another aspect of the present invention, there is provided an ink-jet printing method comprising the steps of:

ejecting an ink to a printing medium by an ink-jet process, and forming an image on the printing medium, wherein the ink is one of the ink-jet inks described above.

According to still another aspect of the present invention, there is provided an ink-jet printing method comprising a step of:

applying a first ink and a second ink on a printing medium in such a manner that the first and the second inks come in contact in a liquid state on the printing medium, wherein the first ink contains a self-dispersing pigment having on its surface at least one anionic group bonded to the surface, directly or via an atomic group, and the second ink contains an anionic or nonionic polymer dispersant or both and a pigment which is dispersible with the aid of the polymer dispersant in an aqueous medium, where the pigment in the second ink has a BET specific surface area not higher than 300 m$^2$/g, and a DBP oil absorption not higher than 150 ml/100 g.

According to still another aspect of the present invention, there is provided an ink-jet printing method comprising a step of:

applying a first ink and a second ink on a printing medium in such a manner that the first and the second inks come in contact in a liquid state on the printing medium, wherein the first ink contains a self-dispersing pigment having on its surface at least one anionic group bonded to the surface, directly or via an atomic group, and the second ink contains an anionic or nonionic polymer dispersant or both and a pigment which is dispersible with the aid of the polymer dispersant in an aqueous medium, where the polymer dispersant contains benzylmethacrylate as a monomer unit.

According to still another aspect of the present Invention, there is provided an ink set comprising a first ink and a second in, wherein the first ink contains a self-dispersing pigment having on its surface at least one anionic group bonded to the surface, directly or via an atomic group, and the second ink contains an anionic or nonionic polymer dispersant or both and a pigment which is dispersible with the aid of the polymer dispersant in an aqueous medium, where the pigment in the second ink has a BET specific surface area not higher than 300 m$^2$/g, and a DBP oil absorption not higher than 150 ml/100 g.

According to still another aspect of the present invention, there is provided an ink set comprising a first ink and a second ink, wherein the first ink contains a self-dispersing pigment having on its surface at least one anionic group bonded to the surface, directly or via an atomic group, and the second ink contains an anionic or nonionic polymer dispersant or both and a pigment which is dispersible with the aid of the polymer dispersant in an aqueous medium.

where the polymer dispersant contains benzylmethacrylate as a monomer unit.

According to still another aspect of the present invention, there is provided an ink-jet printing apparatus comprising an ink-storing part separately containing a first ink and a second ink, and an ink-jet head to eject the first ink and the second ink, wherein the first ink contains a self-dispersing pigment having on its surface at least one anionic group bonded to the surface, directly or via an atomic group, and the second ink contains an anionic or nonionic polymer dispersant or both and a pigment which is dispersible with the aid of the polymer dispersant in an aqueous medium, where the pigment in the second ink has a BET specific surface area not higher than 300 m$^2$/g, and a DBP oil absorption not higher than 150 ml/100 g.

According to still another aspect of the present invention, there is provided an ink-jet printing apparatus comprising an ink-storing part separately containing a first ink and a second ink, and an ink-jet head to eject the first ink and the second ink, wherein the first ink contains a self-dispersing pigment having on its surface at least one anionic group bonded to the surface, directly or via an atomic group, the second ink contains an anionic or nonionic polymer dispersant or both and a pigment which is dispersible with the aid of the polymer dispersant in an aqueous medium, and the polymer dispersant contains benzylmethacrylate as a monomer unit.

BRIEF DESCRIPTION OF THE DRAWINGS

FIG. 14 is a block diagram showing the control system of the printing apparatus described in FIG. 8.

DETAILED DESCRIPTION OF THE PREFERRED EMBODIMENTS

Figure 1:
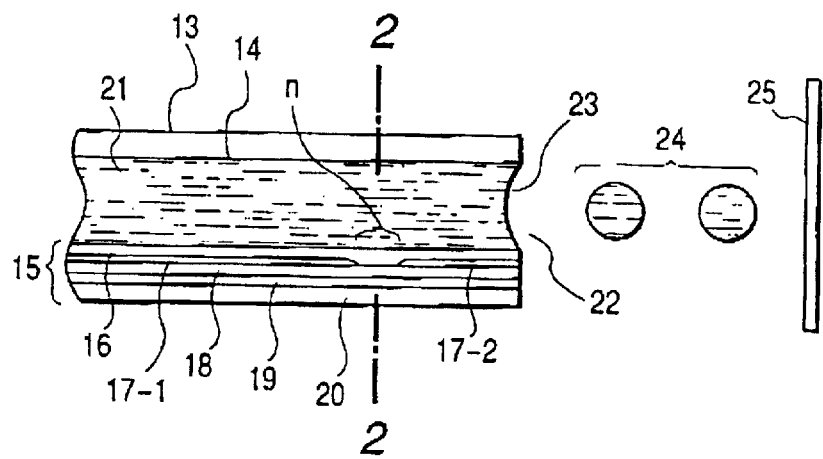
FIG. 1 is a vertical sectional view of a head of an ink-jet printing apparatus.

Studying how to enhance image quality, the inventors have found that an ink containing a self-dispersing pigment, a pigment dispersible in an aqueous medium with the aid of a polymer dispersant and the polymer dispersant can satisfy various factors required for image quality enhancement, and such an ink is very stable. The present invention is based on that finding.

In such an ink, the dispersion state of the pigments is stably maintained even when the amount of the polymer dispersant is reduced, presumably because the self-dispersing pigment (the first pigment) serves as a dispersant for the second pigment that is dispersed by the polymer dispersant. Moreover, when printing is carried out on the printing medium such as paper with this ink, the dot size is large in comparison with an ink containing the second pigment and the polymer dispersant only or an ink containing the first pigment only, and the dot is uniform, high in optical density, and relatively rapid fixability.

The mechanism of such phenomena is not clear, but presumably is as follows: The first pigment and the second pigment onto which the polymer dispersant has attached electronically repulse each other in the ink, to weaken the aggregation force between pigments in comparison with in an ink containing only the second pigment and the dispersant. When such an ink is applied onto paper, diffusion of the second pigment in a direction vertical to the paper surface is difficult because of the attached polymer dispersant, but diffusion in the direction along the paper surface (in the horizontal direction) is not so difficult in comparison with a conventional ink containing the second pigment and the polymer dispersant only. When the conventional ink diffuses in this direction, the polymer dispersant molecules rapidly intertwine with each other or cross-link the pigment molecules as the water content decreases due to the evaporation and penetration into the printing medium, causing strong aggregation of pigment. On the other hand, when the ink according to the present invention diffuses in this direction, the existence of the first pigment prevents or inhibits the macromolecular intertwining or cross-linking of pigments. In addition, the repulsion between the first pigment and the polymer dispersant eases the strong intermolecular force between pigment molecules. As a result, the ink is liable to diffuse in a direction along the printing medium surface. The diffusion is eased but not in disorder, since it is still under the influence of pigment aggregation force. This leads to large dot size with a smaller ejection amount, dot roundness, and good smoothing effect (smoothness of the image formed by plural dots). These phenomena on the paper surface become remarkable when the Ka value by the Bristow method of the ink is less than 1 ml/(m$^2$·msec$^{1/2}$), that is, when the ink has a relatively low penetrability to the printing medium, to improve image quality.

As described above, it is predicted that the specific surface area and oil absorption of the second pigment (a pigment dispersible with a polymer dispersant) participates in the ink-jet printing performance of a pigment ink containing the first (self-dispersing) pigment and the second pigment.

For example, when the pigment is carbon black, the higher the specific surface area and the oil absorption of the carbon black become, the higher the surface activity of the carbon black becomes, requiring more polymer dispersant for stable dispersion. However, when the amount of the polymer dispersant is increased, the amount of free polymer dispersant also increases in the ink to increase the ink viscosity, which will exert harmful influence on continuous ink ejection performance in ink-jet printing.

On the other hand, if the amount of the polymer dispersant is controlled to be in a range satisfying the ejectability, the ink stability then deteriorates. In general, a pigment having high specific surface area and high oil absorption is liable to be influenced by pH. Thus, the pH drop during storage tends to cause problems such as pigment aggregation and precipitation.

Although this phenomenon is not so conspicuous with the ink of the invention containing the first pigment and the second pigment as with the ink containing the second pigment only, still it may be problematic.

Thus, it is preferable that the second pigment has a specific surface area determined by the BET method (BET specific surface area) not higher than 300 m$^2$/g and a DBP oil absorption not higher than 150 ml/100 g, when the above problem is considered.

As described above, the ink of the present invention can satisfy various factors required for achieving higher image quality at a high level, and also it is excellent in stability.

Specifically, the ink of the present invention shows high dispersion stability in the ink tank, and can provide printing properties such as a large dot size, high image density, high rub-off resistance, and excellent dot roundness.

Although the ink of the present invention described above contains a self-dispersing pigment and a pigment dispersible with a polymer dispersant and the polymer dispersant, the self-dispersing pigment is not limited to one species but may be two or more pigments, and the polymer dispersant may be two or more polymer dispersants.

Next, inks of the present invention are explained in detail. The ink according to one embodiment of the present invention comprises a first pigment, for example, a pigment having at least one anionic group bonded directly or via another atomic group to the surface of the pigment to be self-dispersing in an aqueous medium, a second pigment dispersible in the aqueous medium with the aid of a polymer dispersant, and the polymer dispersant.

The ink is described below.

[First Pigment]

The term "self-dispersing pigment" used herein refers to a pigment which can be stably dispersed in an aqueous medium such as water, a water-soluble organic solvent and a mixture thereof without using a dispersant, not forming pigment aggregates which interfere with the normal ink ejection from the orifice in the ink-jet printing. As such a pigment as described above, those having at least one anionic group bonded on their surface directly or via an atomic group are suitably used. The specific examples of such a pigment include carbon black having at least one anionic group bonded to its surface directly or via an atomic group.

The anionic groups bonded to the surface of the carbon black include, for example, —COOM, —SO$_3$M, —PO$_3$HM and —PO$_3$M$_2$, —SO$_2$NH$_2$, —SO$_2$NHCOR (wherein M represents a hydrogen atom, alkaline metal, ammonium or organic ammonium, R represents a linear or branched alkyl group having 1 to 12 carbon atoms, a substituted or unsubstituted phenyl group, or a substituted or unsubstituted naphthyl group). The substituent groups for the phenyl group or the naphthyl group include, for example, a linear or branched alkyl group having 1 to 6 carbon atoms.

The alkaline metals represented by "M" described above include, for example, lithium, sodium and potassium, and the organic ammoniums of "M" include, for example. mono-, di-, and tri-methylammonium, mono-, di-, and triethylammonium and mono-, di-, and trimethanolammonium.

Of the anionic groups described above, —COOM and —SO$_3$M are particularly preferable because a highly stable carbon black dispersion state can be obtained.

It is preferable to use the various anionic groups described above by bonding them to the surface of carbon black via an atomic group. As such an atomic group, there are, for example, a linear or branched alkylene group having 1 to 12 carbon atoms, a substituted or unsubstituted phenylene group, or a substituted or unsubstituted naphthylene group. The substituent groups for the phenylene group or naphthylene group include, for example, a linear or branched alkyl group having 1 to 6 carbon atoms. Specific examples of anionic groups bonded to the surface of carbon black via an atomic group include, for example, —C$_2$H$_4$COOM, —PhSO$_3$M and —PhCOOM where Ph represents a phenyl group and M is as defined above. However, it is to be understood that the present invention is not intended to be limited to the specific examples.

Carbon black having the above-described anionic group bonded to its surface directly or via an atomic group can be produced, for example, as follows.

A —COONa group can be introduced onto the surface of carbon black, for example, by subjecting the commercially available carbon black to oxidative treatment with sodium hypochlorite. Alternatively, an —Ar—COONa group (wherein Ar represents an aryl group) may be introduced onto the surface of carbon black by treating an NH$_2$—Ar—COONa group with nitrous acid, and bonding the formed diazonium salt onto the surface of carbon black. However, the present invention is not limited to these specific examples.

[Second Pigment]

The second pigment applicable to the ink according to this embodiment includes those dispersible by an action of a polymer dispersant in a dispersion medium of the ink, specifically, in an aqueous medium. This means that such a pigment can be stably dispersed in an aqueous medium only when the pigment particles have adsorbed the molecules of a polymer dispersant on the surface. As such pigments, there are, for example, carbon black pigments such as furnace black, lamp black, acetylene black and channel black. The specific examples of such carbon black pigments are described below, and each of the carbon black pigments can be used solely or in proper combination.

As described above, carbon black having a BET specific surface area of 300 m$^2$/g or less and a DBP oil absorption of 150 ml/100 g or less is preferably used in the present invention.

Examples of commercially-available carbon black having such properties include No. 2300, No. 900, MCF88, No. 33, No. 40, No. 45, No. 52, MA7, MA8 and No. 2200B (all, products of Mitsubishi Chemical Industries Limited), RAVEN 1255 (product of Columbian Carbon Japan Limited), REGAL 400R, REGAL 330R, REGAL 660R and MOGUL L (all, products of CABOT Co.), and Color Black FW-1, Color Black FW18, Color Black S170, Color Black S150, Printex 35 and Printex U (all, products of Degussa AG). Alternatively, carbon black newly prepared for the present invention may be used.

For the first pigment, there is no such limitation on the specific surface area or oil absorption.

The amount of coloring materials, which is the sum of the first and the second pigments, preferably ranges from 0.1 to 15% by weight of the ink weight, more preferably 1 to 10% by weight. The ratio of the first pigment to the second pigment is preferably in the range of 5/95 to 97/3 by weight, more preferably 10/90 to 95/5 by weight. Further more preferably, the first pigment/the second pigment ratio =9/1 to 4/6. More preferably, the amount of the first pigment is larger than that of the second pigment. When the amount of the first pigment is larger than that of the second pigment, the ink obtains not only the dispersion stability, but also the ejection stability including ejection efficiency and reliability attributable to the less wetting of the surface of the ink-ejecting orifice.

[Polymer Dispersant]

As a polymer dispersant for uniformly dispersing the second pigment in an aqueous medium, it is suitable to use that function to disperse the pigment in an aqueous medium when adsorbed on the surface of the pigment.

Specifically, high molecular weight copolymers comprised of units containing an aromatic ring as the hydrophobic component are desirable as the polymer dispersant. Preferable monomer units include styrene, α-methylstyrene, benzylacrylate and benzylmethacrylate, phenylacrylate and phenylmethacrylate. Benzylmethacrylate is especially preferable. When the ink of the present invention was prepared by using a polymer dispersant containing at least benzylmethacrylate monomers for a printing test, the ink showed desirable wetting property, in this case, the ink was repelled by the orifice area very well. In this case, it is especially preferable that the orifice area is treated with a silicon ink-repellant.

When the first self-dispersing pigment is combined with the second pigment dispersed by the polymer dispersant at least containing benzylmethacrylate monomer units are combined, it is considered that the stable dispersion state of the first pigment is effectively maintained to prevent the ink from attaching to the ink-repellent orifice area, although its mechanism is not clear.

As the hydrophilic component of the polymer dispersant used for pigment dispersion in water, monomers having carboxyl group are preferably used, for example, acrylic acid, methacrylic acid, maleic acid, itaconic acid, and fumaric acid, but not limited thereto. Acrylic acid and methacrylic acid are preferably used.

The polymer dispersant preferably has an acid value ranging 100–500.

It is especially preferable that the content ratio of the polymer dispersant to the second pigment in the ink is in the range of 10–200% by weight in view of maintaining stable dispersion state of the second pigment in the Ink and also maintaining the ejection stability of the ink.

It is also preferable the weight average molecular weight of the polymer dispersant is in the range of 2000–30000, in view of maintaining stable dispersion state of the second pigment in the ink and also maintaining the ejection stability of the ink.

Further, it is preferable that the polymer dispersant for the second pigment is adjusted to a neutral to alkaline pH to enhance the solubility of the polymer dispersant, and thus to obtain a polymer dispersant of longer shelf life. In this case, however, the pH is preferably in the range of 7–10, since higher pH may cause corrosion of various members of the ink-jet printing apparatus.

The pH adjusting agent to be used includes organic amines such as monoethanolamine, diethanolamine and triethanolamine; alkali metal hydroxides such as sodium hydroxide, lithium hydroxide and potassium hydroxide; organic acids and mineral acids.

[Aqueous Medium]

As an aqueous medium to disperse the first and the second pigments, following water-soluble organic solvents can be used. The water-soluble organic solvents include, for example, alkyl alcohols having 1 to 5 carbon atoms such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones or keto alcohols such as acetone and diacetone alcohol; ethers such as tetrahydrofuran and dioxane; oxyethylene or oxypropylene copolymers such as diethylene glycol, triethylene glycol, tetraethylene glycol, dipropylene glycol, tripropylene glycol and polyethylene glycol: alkylene glycols of which the alkylene group contains 2 to 6 carbon atoms such as ethylene glycol, propylene glycol, trimethylene glycol, triethylene glycol and 1,2,6-hexanetriol; glycerol; lower alkyl ethers such as ethylene glycol monomethyl(or monoethyl) ether, diethylene glycol monomethyl(or monoethyl) ether and triethylene glycol monomethyl(or monoethyl) ether; lower dialkyl ethers of polyhydric alcohols such as triethylene glycol dimethyl(or diethyl) ether and tetraethylene glycol dimethyl(or diethyl) ether; alkanolamines such as monoethanolamine, diethanolamine and triethanolamine; sulfolane, N-methyl-2-pyrrolidone, 2-pyrrolidone, 1,3-dimethyl-2-imidazolidinone. These water-soluble organic solvents can be used singly or in combination thereof.

The content of the aqueous organic solvent in the ink may be less than 80%, preferably in the range of 5–40%.

[Addition of Dye]

Dyes may be added to the ink of this embodiment. The ink which contains a dye as well as the first and the second pigments as well as a dispersant for dispersing the second pigment in an aqueous medium, can form a high quality image free from crazing on a printing medium having a resin coating layer on the surface. Although the mechanism of crazing inhibition is not clear yet, it is considered that on the printing medium the pigment is present as fine aggregates and the dye surrounds the pigment aggregates and fills the interspace of the aggregates. As already described, the aggregation force of the second pigment is eased by the presence of the first pigment. In addition, the addition of a dye further eases the aggregating force of the second pigment, thereby effectively suppresses the unevenness in a printed image such as "crazing" which often occurs on a printing medium of less ink absorbency than the plain paper.

Dyes usable in this embodiment include anionic dyes soluble in an aqueous medium used in this embodiment. For example, known acid dyes, direct dyes and reactive dyes are suitably used. Preferably used are dyes having a disazo- or triazo skeleton structure. Further, preferably two or more dyes different in the structure are used together. Dyes other than black dyes, such as cyan, magenta and yellow dyes, may be used as long as the tone of the ink does not change greatly.

[Other Additives]

Besides the above components, a surfactant, an antifoaming agent, an antiseptic and the like may be added to the pigment inks, as needed, to provide them as inks having desired physical properties.

Examples of the surfactant include anionic surfactants such as fatty acid salts, salts of higher alcohol sulfuric esters, salts of liquid fatty oil sulfuric esters and alkylarylsulfonic acid salts; and nonionic surfactants such as polyoxyethylene alkyl ethers, polyoxyethylene alkyl esters, polyoxyethylene sorbitan alkyl esters, acetylene alcohol and acetylene glycol. One or more of these surfactants may be suitable chosen for use.

The amount of the surfactant is desirably within a range of from 0.01 to 5% by weight based on the total weight of the ink. It is preferred that the amount of the surfactant added be determined in such a manner that the surface tension of the resulting ink is at least 30 mN/m (dyne/cm), because the occurrence of deformed printing (inaccurate ink landing) due to wetting of the orifice can be effectively prevented in the ink-jet printing system used in the present invention.

Further, it is very effective to make the BET Ka value of the ink not higher than $1$ $ml/(m^2 \cdot msec^{1/2})$, in order to further improve the print quality such as sharpness and optical density of the recorded image.

[Printing Method]

The ink of the invention is applied to the printing medium by known ink-applying means, preferably by a known ink-jet printing method where Ink is ejected from a printing head onto the printing medium. The ink-ejection method suitable for the ink of the invention can be any known methods such as the piezo ink-jet method. However, a preferable method is such that a bubble is generated in the ink utilizing heat energy and the ink is ejected by the pressure of the bubble.

The ink amount applied to the printing medium from the printing head is preferable not higher than 0.014 picoliter (pl) per unit area. More specifically, the preferable ink shot is 70 pl or less at 360 dpi, 25 pl or less at 600 dpi. The reason is as follows: When an ink containing one pigment as a coloring material is used, the area factor is insufficient, especially on a normal paper, resulting in low OD. On the other hand, when an ink of the present invention is used, as described above, the area factor becomes so high that the application amount can be reduced.

The present invention also provides ink containers such as an ink cartridge, and a printing head in which an ink-storing part and means for ejecting the ink are integrated.

Further, the present invention provides an ink set comprised of the black ink of the invention and at least one color ink selected from, for example, yellow ink, magenta ink and cyan ink, each of which contained in a separate ink-storing part.

Figure 10:
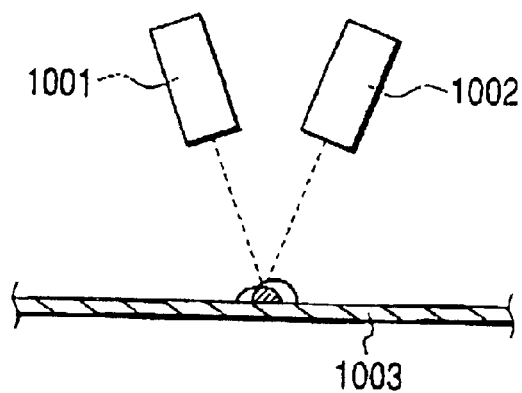
FIG. 10 is a schematic illustration of an ink-jet printing method according to the present invention.

The effect of the present invention described above that the interaction between the first pigment and the second pigment and the polymer dispersant eases the pigment aggregation force thus leading to excellent image formation on the printing medium is not only achieved by using an ink containing these components but also by contacting these components each other in a liquid state on the printing medium. More specifically, the latter method is explained referring to FIG. 10: a first ink containing the first pigment is ejected from the first ink-jet head 1001 to a predetermined position of the printing medium, and a second ink containing a polymer dispersant being nonionic or having the same polarity to the group attached to the first pigment and the second pigment is ejected from the second ink-jet head 1002 to the predetermined position where the first ink was applied or to be applied, in such a manner that the first and the second inks are mixed in a liquid state on the printing medium. This method also forms an ink dot having a large area factor and excellent shape, and high and uniform image density in the dot. It is needless to say that when two inks are separately applied to the printing medium, complete superposition of the landing positions is not required so long as these inks contact each other in a liquid state on the printing medium.

Figure 11:
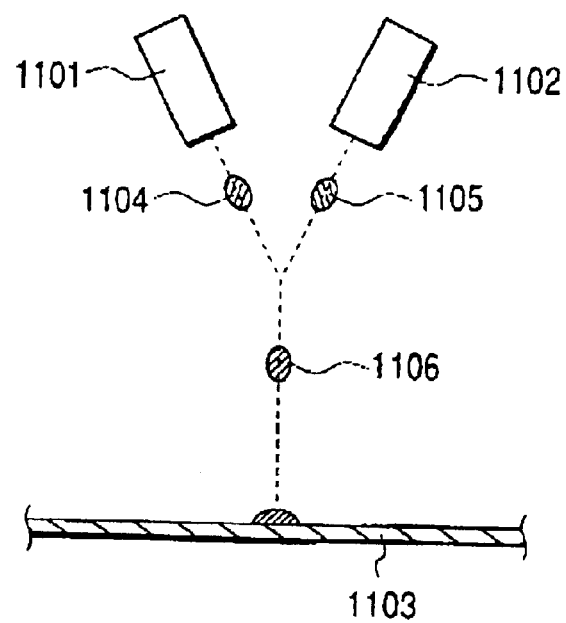
FIG. 11 is a schematic illustration of another ink-jet printing method according to the present invention.

Alternatively, as illustrated in FIG. 11, a first ink (1104) containing the first pigment is ejected from the first ink-jet head 1101, a second ink (1105) containing the second pigment and a polymer dispersant being nonionic or having the same polarity as the group bonded to the first pigment is ejected from the second ink-jet head 1102, and these ink droplets become one droplet (1106) before landing and then the droplet 1106 is applied to a predetermined position of the printing medium 1103. This method too can achieve mixing of the two inks in a liquid state on the printing medium. It is preferable for a mixture of the first and second inks to have a Ka of 1 ml/m$^2$·msec$^{1/2}$ determined by the Bristow method by adjusting properties of both inks.

Figure 12:
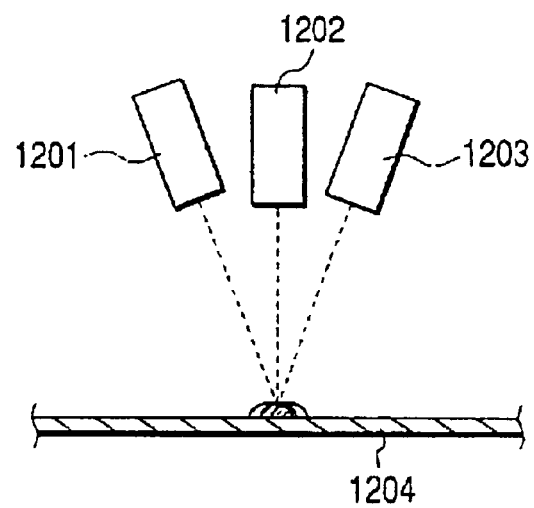
FIG. 12 is a schematic illustration of still another ink-jet printing method according to the present invention.

Further, the effect of the present invention described above that the interaction between the first pigment and the second pigment, the polymer dispersant and a dye eases the pigment aggregation force thus leading to excellent image formation on the printing medium having a coating layer is not only achieved by using an ink containing these components but also by contacting these components each other in a liquid state on the printing medium. More specifically, the latter method is explained referring to FIG. 12: a first ink containing the first pigment is ejected from the first ink-jet head 1201 to a predetermined position of the printing medium 1204, a second ink containing a second pigment and a polymer dispersant being nonionic or having the same polarity to the group attached to the first pigment is ejected from the second ink-jet had 1202 to the predetermined position, and a third ink containing a dye having the same polarity as the group bonded to the first pigment is ejected from the third ink-jet head 1203 to the predetermined position, in such a manner that the first to third inks are mixed in a liquid state on the printing medium. This method also forms an ink dot having a large area factor and excellent shape, and high and uniform image density in the dot. It is needless to say that when two inks are separately applied to the printing medium, complete superpose of the landing positions is not required so long as these inks contact each other in a liquid state on the printing medium.

Figure 13:
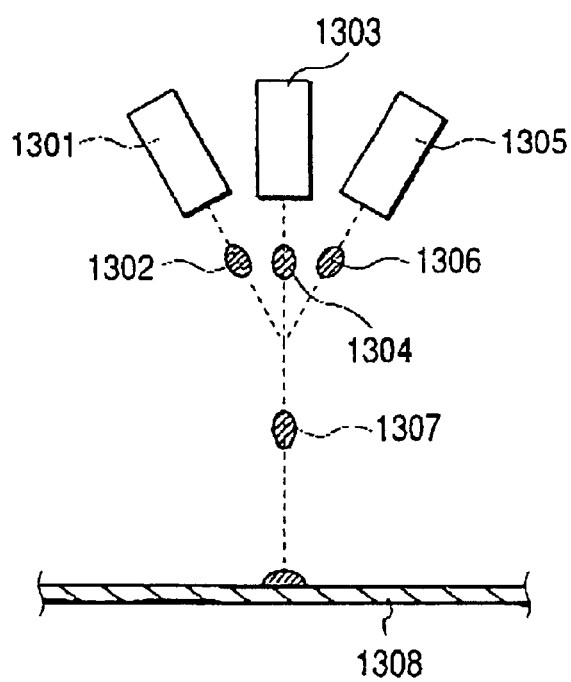
FIG. 13 is a schematic illustration of still another ink-jet printing method according to the present invention.

Alternatively, as illustrated in FIG. 13, a first ink (1302) containing the first pigment is ejected from the first ink-jet head 1301, a second ink (1304) containing the second pigment and a polymer dispersant being nonionic or having the same polarity as the group bonded to the first pigment is ejected from the second ink-jet head 1303, and the third ink (1306) containing a dye having the same polarity as the group attached to the first pigment is ejected from the third ink-jet head 1305, and these ink droplets become one droplet (1307) before landing and then the droplet 1307 is applied to a predetermined position of the printing medium 1308. This method too can achieve mixing of the three inks in a liquid state on the printing medium. It is preferable for a mixture of the first to third inks to have a Ka of 1 ml/m$^2$·msec$^{1/2}$ determined by the Bristow method by adjusting properties of both inks.

[Printing Medium]

The printing medium used in the present invention includes paper, nonwoven fabric, OHP paper and leather, but not limited thereto. As described above, when the ink of the present Invention is applied by the ink-jet method onto a printing medium having a resin layer as a coating layer, the "crazing" of the image formed on the coating layer is effectively prevented.

For example, there are printing media having a resin layer provided on a plastic film or paper. The main component of the coating layer is a water-soluble resin or a resin dispersible in water, which may contain other additives such as a cationic compound, a surfactant and a filler, if necessary.

The water-soluble resin includes, for example, polyvinyl alcohol and modified polyvinyl alcohols such as anion-modified polyvinyl alcohol and acetal-modified polyvinyl alcohol; water-based polyurethane: polyvinyl pyrrolidone and modified polyvinyl pyrrolidones such as copolymer of vinyl pyrrolidone and vinyl acetate, copolymer of vinyl pyrrolidone and dimethylaminoethyl methacrylate, copolymer of quaternary vinylpyrrolidone and dimethylaminoethyl methacrylate, and copolymer of vinylpyrrolidone and methacrylamidopropyl trimethylammonium chloride; modified cellulose such as cationized hydroxyethyl cellulose and water-soluble cellulose resins such as carboxymethyl cellulose, hydroxyethyl cellulose and hydroxypropyl cellulose; synthetic resins such as polyester, polyacrylic acid (ester), melamine resin, or modified resins thereof, graft copolymer containing at least polyester and polyurethane; and natural resins such as albumin, gelatin, casein, starch, cationized starch, gum arabic, and sodium alginate. The water-dispersing resin includes, for example, polyvinyl acetate, ethylene-vinyl acetate copolymer, polystyrene, styrene-(meth)acrylate ester copolymer, (meth)acrylate ester polymer, copolymer of vinyl acetate and (meth)acrylate (ester), poly(meth)acrylamide, meth(acrylamide copolymer, styrene-isoprene copolymer, styrene-butadiene copolymer, polyvinyl ether, and silicon-acrylic copolymer, but not limited thereto.

Alternatively, a cationic compound may be preferably used as the material of the coating layer of the printing medium. Any cationic compound may be used so long as it has a cationic portion in the molecule, for example, there included are cationic surfactants of quaternary ammonium salt such as monoalkylammonium chloride, dialkylammonium chloride, tetramethylammonium chloride, trimethylphenylammonium chloride, and ethylene oxide adduct of ammonium chloride; cationic surfactants of amine salt; amphoteric surfactants having a cationic portion such as alkyl betaine, imidazolium betaine and alanine; polymer or oligomer such as cation-modified polyacrylamide, copolymer of acrylamide and a cationic monomer, polyallylamine, polyamine sulfone, polyvinyl amine polyethylene amine, polyethylene mine, polyamide-epichlorhydrin resin, and polyvinylpyridinium halide.

Further, vinyloxazolidone polymer or copolymer with other common monomer, and vinyl imidazole polymer or copolymer with other common monomer can be used.

Monomers usable for the above copolymers include methacrylate, acrylate, acrylonitrile, vinyl ether, vinyl acetate, ethylene and styrene. Cation-modified cellulose can be also used.

Preferable cationic compounds are as listed above, but not limited thereto.

Concerning the layer thickness, it is preferable to form a coating layer of 0.1 g/m to 100 g/m² by dry weight. preferable. The coating layer may be single-layered or multi-layered such as two-layered or three-layered.

When the ink of the present invention is applied onto a printing medium having a coating layer as described above, "crazing" can be prevented. In addition, the high wettability of the pigment to the coating layer can compensate the poor wettability of a dye. That is, by using the pigment ink of the invention and a dye ink in mixture, the beading phenomenon which may occur with single use of the dye ink can be suppressed.

Figure 2:
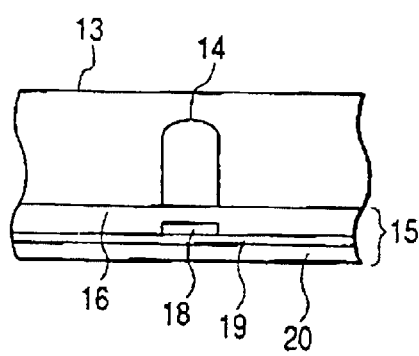
FIG. 2 is a transverse sectional view of a head of an ink-jet printing apparatus.

First, a configuration example of the main part, the head, of an ink-jet printing apparatus utilizing thermal energy is shown in FIGS. 1 and 2.

FIG. 1 is a sectional view of a head 13 along the ink flow path and FIG. 2 is a sectional view taken on line 2—2 of FIG. 1. The head 13 is obtained by adhesion of a heat generating head 15 used for the thermosensitive printing to a glass, ceramic or plastic plate having a groove 14 through which ink flows. The heat generating head 15 comprises a protective film 16 formed of silicon oxide, silicon nitride, silicon carbide or the like, electrodes 17-1 and 17-2 made of aluminum, gold, aluminum-copper alloy etc., a heat generating resistance layer 18 formed of a high melting point substance such as HfB2, TaN and TaAl, a heat accumulating layer 19 made of aluminum oxide, and a highly heat-radiating substrate 20 made of silicon, aluminum and aluminum nitride.

When an electric signal information item is applied to the aluminum electrodes 17-1 and 17-2, the region designated with n of the heat generating head 15 is rapidly heated, a bubble is generated in the ink contacting here, the meniscus 23 protrudes under this pressure and the ink is ejected to make an ink droplet 24 and fly to a printing medium 25 from the discharge orifice 22.

Figure 3:
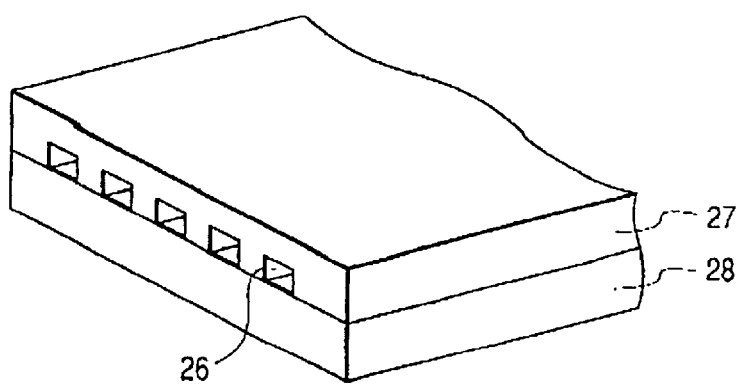
FIG. 3 is an oblique outside view of a multihead made of the head shown in FIG. 1.

FIG. 3 shows an appearance view of a multihead comprised of an array of many heads shown in FIG. 1. The relevant multihead is fabricated by a close adhesion of a heat generating head 28 similar to that described in FIG. 1 to a glass plate 27 having a multi-groove 26. Other than the multihead using glass plate shown above, multiheads using resin materials can also be used in the present invention. If a multihead of resin material is used, the head preferably is water repellent to prevent ink from attaching to the orifice area. A water-repellant layer 901 containing silicon material or fluorine material onto the orifice area can provide the orifice area with water-repellency. Such a layer can be formed by applying a water repelling agent containing a silicon material or fluorine material.

Figure 4:
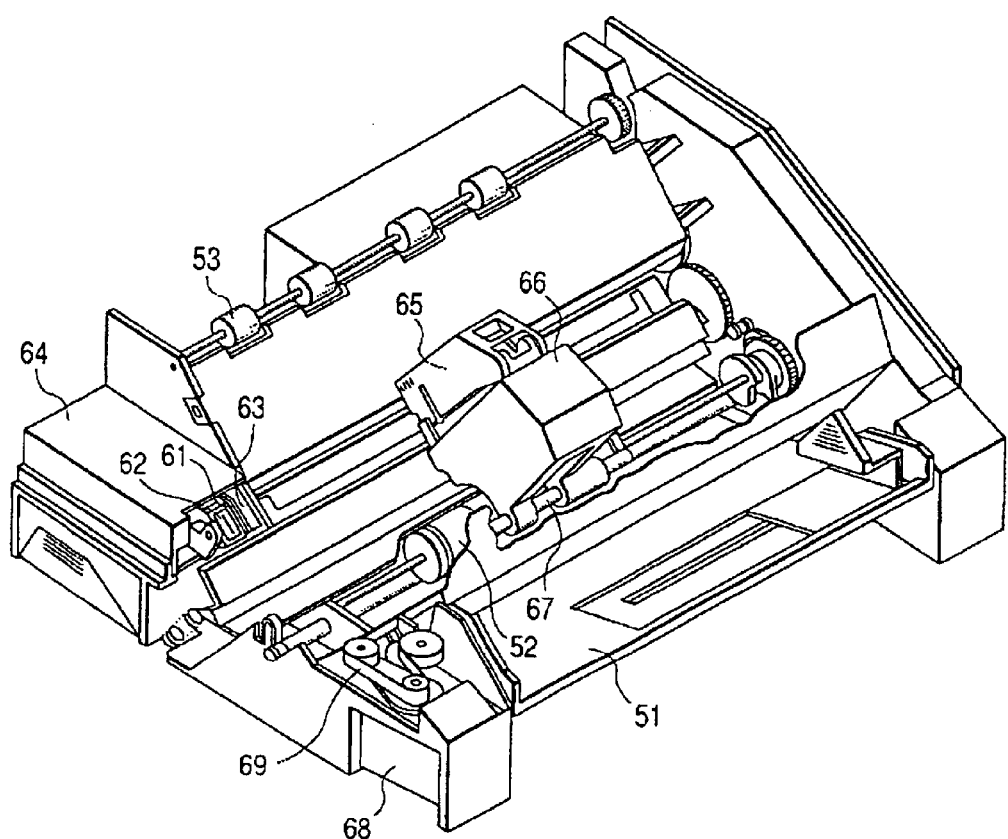
FIG. 4 is an oblique view of a configuration of a printing apparatus.

FIG. 4 shows one example of an ink-jet printing apparatus with the above head incorporated. In FIG. 4, numeral 61 denotes a blade serving as the wiping member, one end of which is retained by a blade retaining member to make a stationary end, thereby shaping a cantilever as a whole. The blade 61 is disposed at a position adjacent to the printing area by the printing head 65 and is retained in the shape of protruding into the moving route of the printing head 65 in case of this example. Numeral 62 denotes a cap on the ejection orifice surface of the printing head 65, which is located at the home position adjacent to the blade 61 and so arranged as to move in a direction perpendicular to the movement of the printing head 65, to butt against the ink ejection orifice and to fulfill the capping. Furthermore, numeral 63 denotes an ink absorber provided adjacently to the blade 61, which is retained in the shape of protruding into the moving route of the printing head 65 as with the blade 61.

A discharge recovering section 64 comprises the above blade 61, the above cap 62 and the above ink absorber 63 and the moisture, dust and the like on the ink ejection orifice are removed by the blade 61 and the ink absorber 63.

Numerals 65 and 66 denotes a printing head equipped with discharge energy generating means which discharges ink to the printing medium opposed to the ejection orifice face from a ejection orifice disposed to perform printing and an carriage for loading and moving the printing head 65, respectively. The carriage 66 is slidably engaged with a guide shaft 67 and part of the carriage 66 is connected (unillustrated) to the belt 69 driven by a motor 68. Thereby, the carriage 66 is enabled to move along the guide shaft 67, thus enabling the printing area by the printing head 65 and its adjacent areas to move.

Numerals 51 and 52 denote a paper feed section for inserting a printing medium and a paper feed roller driven by an unillustrated motor, respectively.

By these constituents, the printing medium is fed to the position opposed to the ejection orifice face of the printing head 65 and paper is discharged to the paper discharge section disposed with the paper discharge roller 53 according to the progress of printing.

In a return of the printing head 65 to the home position at the end of printing or the like with the above configuration, the cap 62 of the discharge recovering section 64 is averted from the moving route of the printing head 65, whereas the blade 61 protrudes into the moving route. As a result, the ejection orifice face of the printing head 65 is wiped. When the cap 62 caps the ejection orifice face of the printing head 65 by butting, the cap 62 moves in such a manner as to protrude into the moving route of the printing head.

When the printing head 65 moves from the home position to the printing start position, the cap 62 and the blade 61 stand at the same position as that of the above wiping. As a result, the ejection orifice face of the printing head 65 is wiped also in this move.

The above move of the printing head 65 to the home position is not only performed at the completion of printing and at the recovery of discharge, but also the printing head 65 moves at given Intervals to the home position adjacent to the printing area while moving through the printing area for printing and the above wiping is carried out with this move.

Figure 5:
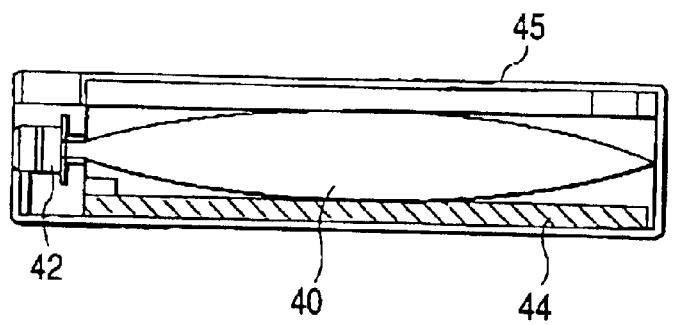
FIG. 5 is one example of an ink cartridge.

FIG. 5 shows one example of an ink supply member for the head, an ink cartridge 45 for storing the ink supplied via a tube. Here, numeral 40 denotes an ink-storing section for storing the supply ink, e.g. an ink bag, at the tip of which a rubber stopper 42 is provided. By inserting a needle (unillustrated) into this stopper 42, the ink in the ink sack 40 is enabled to be supplied to the head. Numeral 44 denotes an ink absorber for receiving the waste ink. As the ink store section, it is preferable for the present invention that the liquid contact surface with ink is made of polyolefin, especially polyethylene.

Figure 6:
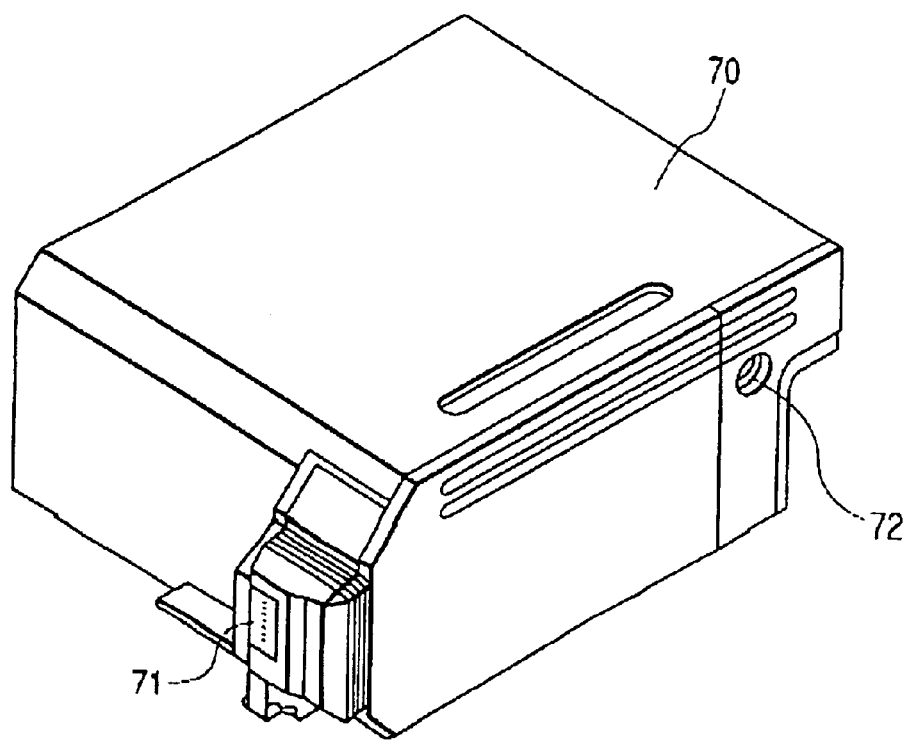
FIG. 6 is a vertical sectional view of one example of ink cartridge.

An ink-jet printing apparatus according to the present invention is not limited to those comprising a head and an ink cartridge separately as mentioned above, but is also appropriately applied to integrated one as shown in FIG. 6. In FIG. 6, numeral 70 denotes a printing unit in which an ink-storing section for storing ink, e.g. an ink absorber, is accommodated and the ink contained in the ink absorber is discharged as an ink droplet from the head section 71 having a plurality of orifices. As materials of an ink absorber, polyurethane is preferably used.

Next, as another embodiment of an ink-jet printing apparatus making good use of mechanical energy, is described an On-Demand type ink-jet printing apparatus comprising a nozzle-forming substrate having a plurality of nozzles, pressure-generating devices composed of a piezoelectric material and an electric conductive material provided in an opposing relation to the nozzles, and an ink filled around the pressure-generating devices, wherein the pressure-generating devices are changed by voltage applied to eject droplets of the ink from the nozzles. An example of the construction of a printing head, which is a main component of such a printing apparatus, is illustrated in FIG. 7.

The head is composed of an ink flow path 80 communicating with an ink chamber (not illustrated), an orifice plate 81 through which ink droplets having a desired volume are ejected, a vibration plate 82 for directly applying a pressure to the ink, a piezoelectric element 83 bonded to the vibration plate 82 undergoing a change according to an electric signal, and a substrate 84 adapted to support and fix the orifice plate 81, the vibration plate 82 and the like thereon.

Figure 7:
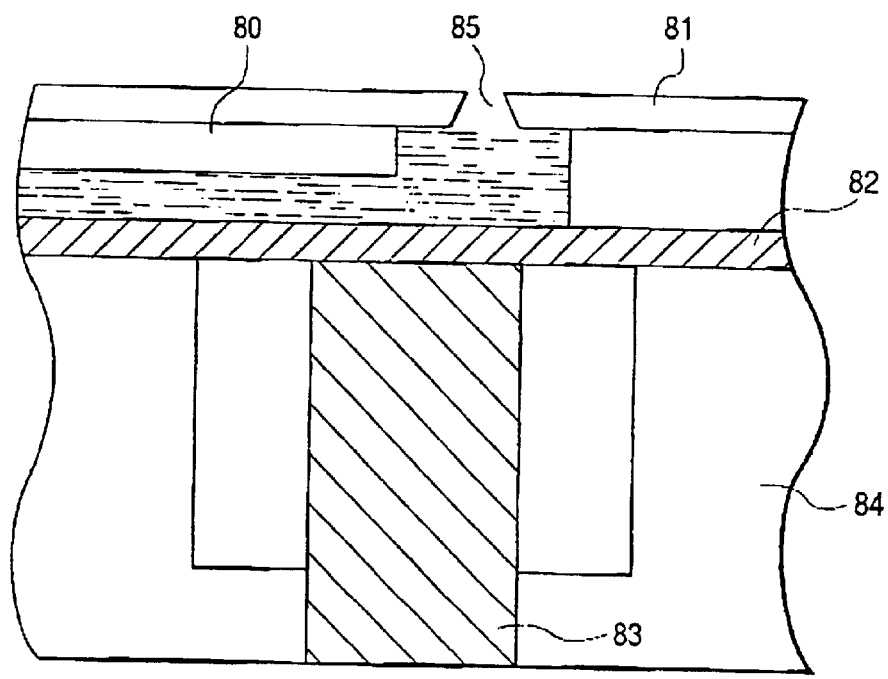
FIG. 7 is a schematic cross sectional view of another configuration of an ink-jet printing head.

In FIG. 7, the ink flow path 80 is formed with a photosensitive resin or the like. The orifice plate 81 is made of a metal such as stainless steel or nickel, and an ejection opening 85 which is formed by electroforming, punching by press-working, or the like. The vibration plate 82 is formed with a film of a metal such as stainless steel, nickel or titanium and a high-modulus resin film or the like. The piezoelectric element 83 is made of a dielectric material such as barium titanate or PZT (lead zircoate titanate; pb[ZrTi]O$_2$).

The printing head with the above construction is operated in such a manner that pulsed voltage is applied to the piezoelectric element 83 to generate a stress to cause strain, the vibration plate 82 bonded to the piezoelectric element 83 is deformed by the energy of the stress, and the ink in the ink flow path 80 is thus perpendicularly pressurized to eject Ink droplets (not illustrated) from the ejection opening 85 of the orifice plate 81, thereby conducting printing.

Such a printing head is used by incorporating it into an ink-jet printing apparatus similar to that illustrated in FIG. 4. Operation of details of the ink-jet printing apparatus may be conducted in the same manner as described above.

As described above, according to the present invention, an ink containing a self-dispersing pigment, a pigment dispersible in an aqueous medium with the aid of a polymer dispersant and the polymer dispersant has excellent storage stability, since the dispersion state of the pigments is stably maintained even when the amount of the polymer dispersant is reduced, presumably because the self-dispersing pigment (the first pigment) serves as a dispersant for the second pigment that is dispersed by the polymer dispersant. On the other hand, when printing is carried out on paper with this ink, it gives ink dots of proper width, of uniform image density and almost free from blur, with the fine particles of pigment aggregates distributing uniformly in the dots, probably because the pigment aggregation due to the interaction between the second pigment and the polymer dispersant on the printing medium is eased by the first pigment. In addition, according to the present invention, sticking of the ink to the water repellent orifice area can be very effectively prevented for carrying out stable ink-jet printing.

Further, an ink of the present invention has a stable poor wettability to the orifice area. Here, "poor wettability" means the ink hardly attaches to the orifice area or easily removed even if it attaches to it. Thus, the accuracy of the ink election direction becomes steady, which is very effective in stable formation of high grade images. Further, with another ink of the present invention which contains a dye in addition to the first pigment, the second pigment and the polymer dispersant, the pigment aggregates take a fine particulate form on the printing medium probably because the addition of a dye further eases the aggregating force of the second pigment, and the dye surrounds the particulate aggregates. Unevenness of the printed image is suppressed as a whole. This effect is remarkably observed as the suppression or prevention of crazing when the ink-jet printing is carried out on a printing medium of poor ink absorbency.

EXAMPLES

Examples according to the above embodiments are described.

Example 1

Figure 8:
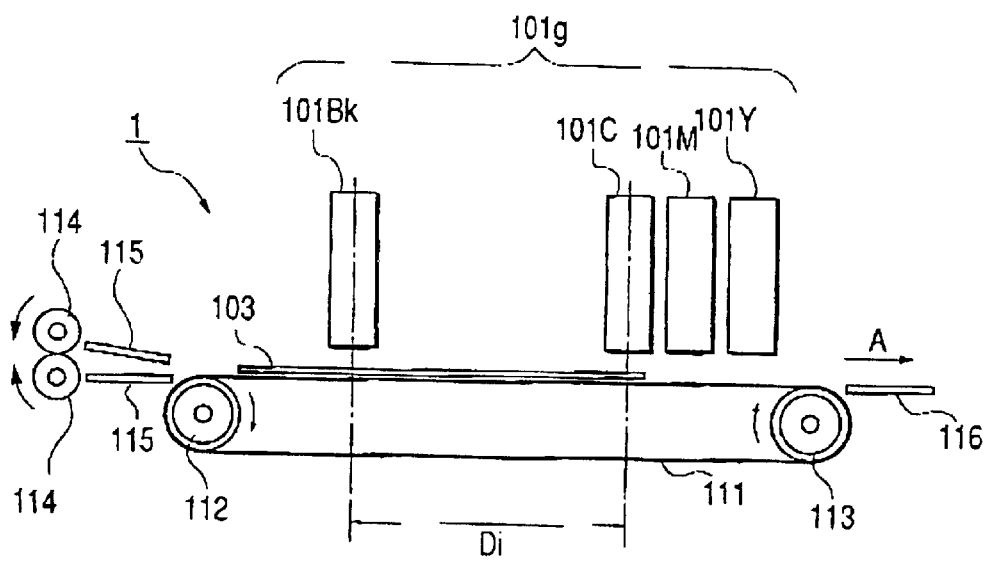
FIG. 8 is a side view of a schematic configuration of an ink-jet printing apparatus according to the present invention.
Figure 9:
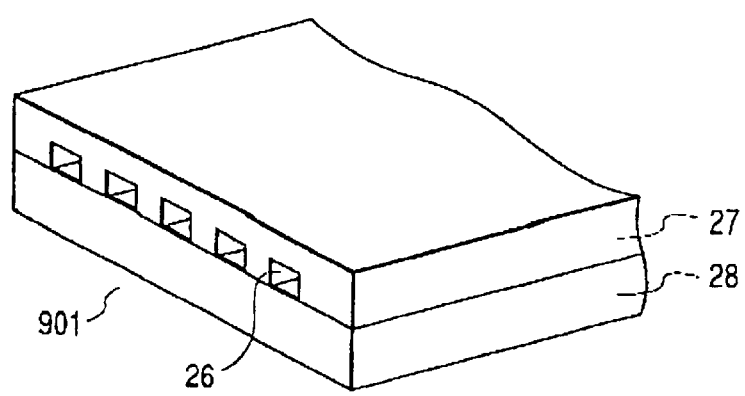
FIG. 9 is a schematic oblique view of an ink-jet printing head having a water-repellent orifice face.

FIG. 8 is a side view schematically illustrating a full line type printing apparatus according to the first example of the present invention.

This printing apparatus 1 adopts an ink-jet printing method in which printing is carried out by ejecting an ink from multiple full line type print heads (ejecting portions) arranged in prescribed positions toward the direction in which a printing medium as a printing medium is conveyed (in the direction shown by the arrow A in the figure). It operates under control of a control circuit (not shown).

Each print head 101Bk, 101C, 101M and 101Y of a head group 101g has about 7200 ink-ejecting ports arranged in the transverse direction of a printing paper 103 (in the direction perpendicular to the sheet shown in the figure) conveyed in the direction shown by the arrow A in the figure. The printing apparatus can perform printing on a printing paper to a maximum size of A3.

The printing paper 103 is conveyed in the direction A with the aid of rotation of a pair of resist rollers 114 which is driven by a conveyance motor, guided by a pair of guide plates 115 so as to register its tips, and conveyed by a conveyance belt 111. The conveyance belt 111 which is an endless belt is held by two rollers 112 and 113, and the displacement in vertical direction of its upper side portion is regulated by a platen 104. When the roller 113 is rotationally driven, the printing paper is conveyed. The printing paper 113 is held to the conveyance belt 111 by electrostatic holding. The roller 113 is rotationally driven by a driving source, such as a motor, not shown in the figure in such a direction that the printing paper 103 is conveyed in the direction shown by the arrow A. The printing paper 103 having been subjected to printing while being conveyed on the conveyance belt 111 is delivered onto a stocker 116.

Print heads of a printing head group 101g consisting of a head 101Bk for ejecting a black ink, and heads for ejecting color inks (a cyan head 101C, a magenta head 101M and an yellow head 101Y) are arranged in the direction A in which the printing paper 103 is conveyed. Print of black letters and color images are made by ejecting each inks from each print head.

FIG. 14 is a block diagram illustrating a control system of the full line type printing apparatus 1 of FIG. 8.

A system controller 201 includes a microprocessor, ROM for storing a control program executed in this apparatus and RAM used as a work area when the microprocessor performs processing, and controls the entire apparatus. A motor 204 rotates the roller 113 shown in FIG. 6 to convey printing paper while its drive is being controlled via a driver 202.

A host computer 206 transfers the information to be printed to the printing apparatus 1 of this embodiment and controls the printing operation. A receiving buffer 207 temporarily stores the data from the host computer 206 until the system controller 201 reads the data. A frame memory 208 is a memory for expanding the data to be printed to image data and has a memory size required for printing. Although the frame memory 208 is described as being capable of storing data for a sheet of printing paper in this embodiment, the present invention is not intended to be limited to a specific memory capacity.

Buffer 209P temporarily stores the data to be printed, and their storage capacity varies depending on the number of ejecting ports of print heads. A printing controller 210 is provided for properly controlling the drive of print heads under the command from the system controller 201 and controls drive frequency, the number of printing data, etc. A driver 211 drives the print heads 101Bk, 101C, 101M and 101Y for ejecting their respective inks and is controlled by the signal from the printing controller 210.

In the above system, print data are transferred from the host computer 206 to the receiving buffer 207 to be temporarily stored. The print data stored in the receiving buffer 207 is read by the system controller 201 and expanded to the buffers 209S and 209P. And paper jam, out-of-ink, out-of-paper, etc. can be detected by various detection signals from a trouble sensor 222.

The printing controller 210 controls the ejection operation of each print head based on the print data in the buffer and 209P and the liquid treatment data.

In this example, ink-ejecting ports of each print head were arranged at a density of 600 dpi, and printing was carried out at a dot density of 600 dpi in a direction of the conveyance of the printing paper. Accordingly, the dot density of a printed image etc. in this example is 600 dpi in both row and column. The ejecting frequency of each head was 4 KHz, and each head ejects 15 pl per ejection.

In the ink-jet printing apparatus in this Example, the distance Di between the black head 101Bk and the cyan head 101C is relatively wide as shown in FIG. 8, which can inhibit the color mixing due to feathering on the boundary between a region printed with a black ink and a region printed with a color ink. However, if a print medium having a coating layer is exclusively used, as feathering itself is inhibited, Di can be made shorter which enables making the apparatus size smaller.

The composition of the black ink used in this Example is shown below. In Tables shown below, total of the components makes 100 parts by weight, and Acetylenol EH is a product of Kawaken Fine Chemicals Co., Ltd.

TABLE 1

| Pigment dispersant 1 | 45 parts |
| Pigment dispersant 4 | 5 parts |
| Glycerol | 6 parts |
| Diethylene glycol | 5 parts |
| Acetylenol EH | 0.1 part |
| Water | balance |

The pigment dispersions were prepared as follows: 300 g of acid carbon black (trade name: MA-77, pH 3.0, a product of Mitsubishi Chemical Industries, Ltd.) was mixed with 100 ml water, to which 450 g of sodium hypochlorite (active chlorine concentration: 12%) was added dropwise, and stirred for 10 hours at 100–105° C. Thus obtained slurry was filtered with TOYO filter paper No. 2 (from Advantist Co., Ltd.), and the pigment particles were fully water-washed, then the pigment wet cake was resuspended in water to deionize to a conductivity 0.2 $\mu S$ by using a reverse osmotic membrane. Then the pigment dispersion (pH 8–10) was concentrated to a pigment concentration of 10%. Thus, obtained was a pigment dispersion in which an anionically charged self-dispersing carbon black having —COOH group directly bonded onto the surface was dispersed.

The pigment dispersion 4 was prepared as follows: 5 parts of benzylmethacrylate-methacrylate copolymer (weight ratio 1:1, acid value 400, average molecular weight of 9000), as a dispersant, 4 parts of monoethanolamine and 81 parts of water were mixed. And the mixture was heated to 70° C. in a water bath to completely dissolve the resin content. Resin cannot sometimes be completely dissolved if its content is low. Accordingly, when intending to dissolve resin, a solution with a desired resin content may be prepared by diluting the solution with a high resin content previously prepared. To this solution added was 10 parts of carbon black of surface area by BET method 150 $m^2/g$, and of DBP oil absorbency 50 ml/g that is not dispersible in an aqueous solution without a dispersant, and the solution was subjected to premixing for 30 minutes. Then the following operation was carried out to obtain the pigment dispersion 2 in which the carbon black was dispersed in an aqueous medium with the aid of a dispersant.

Disperser: Side Grinder
(Igarashi Machine Industry Co., Ltd.)
Grinding medium: zirconia beads with a 1 mm diameter
Packing of grinding medium: 50% (by volume)
Grinding duration: 3 hours
Centrifuging (12000 RPM, 20 minutes)

Thus obtained ink has a Ka value of 0.32 ml/$m^2$·$msec^{1/2}$.

The ink prepared as above was filled in an ink tank of an ink-jet printing apparatus described above, and printing was carried out at an ejection frequency of 7.2 kHz. The resolution of the printing apparatus was 360 dpi×720 dpi, and the orifice area had been treated with a silicon ink-repellent As a result, obtained was a good printed image having large dot size, high optical density, high rub-off resistance, high dot roundness, and no white streaks.

The ink was repelled by the orifice area very well. Thus, high ejection performance was sustained. After $1 \times 10^8$ pulses, ejection clogging or irregular ejection was not observed.

Example 2

Another Bk ink may have the following composition.

TABLE 2

| Pigment dispersion 2 | 40 parts |
| Pigment dispersion 4 | 10 parts |
| Glycerol | 6 parts |
| Acetylenol EH | 0.2% |
| Water | balance |

Pigment dispersion 2 was prepared as follows: 10 g of carbon black with a surface area of 230 $m^2/g$ by BET and a DBP oil absorption of 70 ml/100 g and 3.41 g of p-aminobenzoic acid were fully mixed in 72 g of water, then 1.62 g of nitric acid was added dropwise and stirred at 70° C. After several minutes, a solution of 1.07 g of sodium nitrite in 5 g of water was added and stirred for an additional 1 hour. The slurry obtained in this manner was filtered with Toyo filter paper No. 2 (from Advantist Co., Ltd.), and its pigment particles were fully water-washed, followed by the drying in an oven at 90° C. Then water was added to the pigment to prepare 10 wt % pigment aqueous solution. Thus, obtained was pigment dispersion 2 in which an anionically charged self-dispersing carbon black having a hydrophilic group bonded onto its surface via a phenyl group, as shown by the following formula, was dispersed.

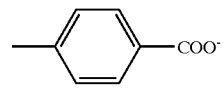

The pigment dispersion 4 was prepared in the same manner as in Example 1.

Thus obtained ink has a Ka value of 0.4 (ml/m$^2$·msec$^{1/2}$).

The ink prepared as above was filled in an ink tank of an ink-jet printing apparatus described above, and printing was carried out at an ejection frequency of 7.2 kHz. The resolution of the printing apparatus was 360 dpi×720 dpi, and the orifice area had been treated with a silicon ink-repellent. As a result, obtained was a good printed image having large dot size, high optical density, high rub-off resistance, high dot roundness, and no white streaks.

The ink was repelled by the orifice area very well. Thus, high ejection performance was sustained. After 1×10$^8$ pulses, ejection clogging or irregular ejection was not observed.

Another Bk ink may have the following composition.

TABLE 3

| Pigment dispersion 3 | 47 parts |
| Pigment dispersion 4 | 3 parts |
| C.I. Direct Blue 199 | 1 part |
| Glycerol | 6 parts |
| Diethylene glycol | 5 parts |
| Acetylenol EH | 0.1% |
| Water | balance |

The pigment dispersion 3 was prepared as follows:

A solution was prepared by dissolving 5 g of conc. HCl 5 into 5.3 g of water, and into which 1.85 g of anthranilic acid was added at 5° C. By maintaining the solution of anthranilic acid at 10° C. or lower, a solution of 8.7 g of sodium nitrite in 8.5 g of water (5° C.) was added and stirred for 15 minutes. To this solution, 20 g of carbon black with a surface area of 320 m$^2$/g by BET and a DBP oil absorption of 120 ml/100 g was added and stirred for 15 minutes. The slurry obtained in this manner was filtered with TOYO filter paper No. 2 (from Advantist Co., Ltd.), and the pigment particles were fully washed with water, and then dried in an oven at 110° C. Then water was added to the pigment to prepare 10 wt % pigment aqueous solution. Thus, obtained was the pigment dispersion 3 in which an anionically charged self-dispersing carbon black having a hydrophilic group bonded onto its surface via a phenyl group, as shown by the following formula, was dispersed.

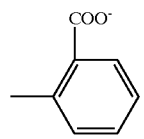

The pigment dispersion 4 was prepared in the same manner as in Example 1.

The ink prepared as above was filled in an ink tank of an ink-jet printing apparatus described above, and printing was carried out at an ejection frequency of 7.2 kHz. The resolution of the printing apparatus was 360 dpi×720 dpi, and the orifice area had been treated with a silicon ink-repellent. As a result, obtained was a good printed image having large dot size, high optical density, high rub-off resistance, high dot roundness, and no white streaks.

The ink was repelled by the orifice area very well. Thus, high ejection performance was sustained. After 1×10$^8$ pulses, ejection clogging or irregular ejection was not observed.

Comparative Example 1

As a comparative example to the above Examples 1 to 3, an ink of the following composition was prepared. The pigment dispersion 4 was prepared in the same manner as in Example 1.

| Pigment dispersion 4 | 50 parts |
| Ethylene glycol | 8 parts |
| Glycerol | 5 parts |
| Isopropyl alcohol | 4 parts |
| Water | balance |

The ink prepared as above was filled in an ink tank of an ink-jet printing apparatus described above, and printing was carried out at an ejection frequency of 7.2 kHz. The resolution of the printing apparatus was 360 dpi×720 dpi, and the orifice area had been treated with a silicon ink-repellent As a result, obtained was a printed image having small dot size, low rub-off resistance, poor dot roundness, and white streaks. The ink was poorly repelled by the orifice area. Thus, after 1×10$^8$ pulses, ejection clogging or irregular ejection was conspicuous.

What is claimed is:

1. An ink comprising a first pigment, a second pigment, a polymer dispersant and an aqueous medium;
   the first pigment being a self-dispersing pigment having on its surface at least one anionic group bonded to the surface directly or via an atomic group,
   the second pigment being dispersed in the aqueous medium by the polymer dispersant, and
   the polymer dispersant being a copolymer of a benzylmethacrylate monomer unit and a methacrylic acid monomer unit.

2. The ink according to claim 1, wherein the benzylmethacrylate monomer unit and the methacrylic acid monomer unit are present in a molar ratio of 1:1.

3. The ink according to claim 1, wherein the second pigment has a BET specific surface area of 300 m$^2$/g or less, and a DBP oil absorption of 150 mg/100 g or less.

4. The ink according to claim 1, wherein the anionic group bonded to the first pigment is selected from the group consisting of —COOM, —SO$_3$M, —PO$_3$HM and —PO$_3$M$_2$, —SO$_2$NH$_2$, —SO$_2$NHCOR, wherein M represents a hydrogen atom, alkaline metal, ammonium or organic ammonium, R represents a linear or branched alkyl group having 1 to 12 carbon atoms, a substituted or unsubstituted phenyl group, or a substituted or unsubstituted naphthyl group.

5. The ink according to claim 1, wherein the atomic group is selected from the group consisting of substituted or substituted alkylene of 1–12 carbon atoms, substituted or unsubstituted phenylene, and substituted or unsubstituted naphthylene.

6. The ink according to claim 1, wherein the polymer dispersant has a weight average molecular weight of 2000–30000.

7. The ink according to clam 1, wherein the polymer dispersant has an acid value of 100–500.

8. The ink according to claim 1, wherein the polymer dispersant is contained in an amount of 10–200% by weight of the second pigment.

9. The ink according to claim 1, wherein the second pigment is dispersed in the ink by adsorbing the polymer dispersant on its surface.

10. The ink according to claim 1, wherein the first pigment is contained in a ratio to the second pigment of 95/5 to 50/50.

11. The ink according to claim 1, wherein the ink contains a dye.

12. The ink according to claim 11, wherein the dye is an anionic dye.

13. The ink according to claim 12, wherein the anionic dye is selected from the group consisting of an acidic dye, a direct dye, and a reactive dye.

14. The ink according to claim 1, wherein the ink is for ink-jet printing.

15. An ink-jet printing method comprising the steps of:
ejecting an ink to a printing medium by an ink-jet process, and
forming an image on the printing medium,
wherein the ink is an ink according to claim 14.

16. An ink-jet printing apparatus comprising an ink-storing part containing an ink according to claim 14, and an ink-jet head to eject the ink.

17. The ink-jet printing apparatus according to claim 16, wherein at least part of an orifice area of the ink-jet head is water repellent.

18. The ink-jet printing apparatus according to claim 17, wherein at least part of an orifice area of the ink-jet head is covered with a water repellent silicon film.

19. The ink-jet printing apparatus according to claim 16, wherein at least part of an orifice area of the ink-jet head is covered with a water repellent silicon film.

20. A printing unit comprising an ink-storing part containing an ink according to claim 14, and an ink-jet head to eject the ink.

21. The printing unit according to claim 20, wherein at least part of an orifice area of the ink-jet head is water repellent.

22. The printing unit according to claim 21, wherein at least part of an orifice area of the ink-jet head is covered with a water repellent silicon film.

23. The printing unit according to claim 20, wherein at least part of an orifice area of the ink-jet head is covered with a water repellent silicon film.

24. An ink cartridge comprising an ink-storing part containing an ink according to claim 14, wherein the ink cartridge is removable and is attached to an ink-jet head that ejects the ink, with the ink cartridge supplying the ink to the ink-jet head when attached thereto.

25. The ink cartridge according to claim 24, wherein at least part of an orifice area of the ink-jet head is water repellent.

26. An ink cartridge comprising an ink-storing part containing an ink according to claim 1.

27. An ink-jet printing method comprising a step of:
applying a first ink and a second ink on a printing medium in such a manner that the first and the second inks come in contact in a liquid state on the printing medium,
wherein the first ink contains a self-dispersing pigment having on its surface at least one anionic group bonded to the surface, directly or via an atomic group,
the second ink contains an anionic or nonionic polymer dispersant or both and a pigment which is dispersible with the aid of the polymer dispersant in an aqueous medium,
the pigment in the second ink has a BET specific surface area not higher than 300 m$^2$/g, and a DBP oil absorption not higher than 150 ml/100 g, and
the polymer dispersant is a copolymer of a benzyl-methacrylate monomer unit and a methacrylic acid monomer unit.

28. An ink-jet printing method comprising a step of:
applying a first ink and a second ink on a printing medium in such a manner that the first and the second inks come in contact in a liquid state on the printing medium,
wherein the first ink contains a self-dispersing pigment having on its surface at least one anionic group bonded to the surface, directly or via an atomic group,
the second ink contains an anionic or nonionic polymer dispersant or both and a pigment which is dispersible with the aid of the polymer dispersant in an aqueous medium, and
the polymer dispersant is a copolymer of a benzyl-methacrylate monomer unit and a methacrylic acid monomer unit.

29. An ink set comprising a first ink and a second ink,
wherein the first ink contains a self-dispersing pigment having on its surface at least one anionic group bonded to the surface, directly or via an atomic group,
the second ink contains an anionic or nonionic polymer dispersant or both and a pigment which is dispersible with the aid of the polymer dispersant in an aqueous medium,
the pigment in the second ink has a BET specific surface area not higher than 300 m$^2$/g, and a DBP oil absorption not higher than 150 ml/100 g, and
the polymer dispersant is a copolymer of a benzyl-methacrylate monomer unit and a methacrylic acid monomer unit.

30. An ink set comprising a first ink and a second ink,
wherein the first ink contains a self-dispersing pigment having on its surface at least one anionic group bonded to the surface, directly or via an atomic group,
the second ink contains an anionic or nonionic polymer dispersant or both and a pigment which is dispersible with the aid of the polymer dispersant in an aqueous medium, and
the polymer dispersant is a copolymer of a benzyl-methacrylate monomer unit and a methacrylic acid monomer unit.

31. An ink-jet printing apparatus comprising an ink-storing part separately containing a first ink and a second ink, and an ink-jet head to eject the first ink and the second ink,
wherein the first ink contains a self-dispersing pigment having on its surface at least one anionic group bonded to the surface, directly or via an atomic group, the second ink contains an anionic or nonionic polymer dispersant or both and a pigment which is dispersible with the aid of the polymer dispersant in an aqueous medium, the pigment in the second ink has a BET specific surface area not higher than 300 m$^2$/g, and a DBP oil absorption not higher than 150 ml/100 g, and the polymer dispersant is a copolymer of a benzyl-methacrylate monomer unit and a methacrylic acid monomer unit.

32. An ink-jet printing apparatus comprising an ink-storing part separately containing a first ink and a second ink, and an ink-jet head to eject the first ink and the second ink, wherein the first ink contains a self-dispersing pigment having on its surface at least one anionic group bonded to the surface, directly or via an atomic group, the second ink contains an anionic or nonionic polymer dispersant or both and a pigment which is dispersible with the aid of the polymer dispersant in an aqueous medium, the polymer dispersant is a copolymer of a benzyl-methacrylate monomer unit and a methacrylic acid monomer unit.

* * * * *

UNITED STATES PATENT AND TRADEMARK OFFICE
CERTIFICATE OF CORRECTION

PATENT NO. : 6,860,593 B2
APPLICATION NO. : 10/241567
DATED : March 1, 2005
INVENTOR(S) : Akio Kashiwazaki et al.

It is certified that error appears in the above-identified patent and that said Letters Patent is hereby corrected as shown below:

COLUMN 1
Line 14, "Ink-jet" should read --ink-jet--.
Line 22, "Ink-jet" should read --ink-jet--.
Line 51, "Ink" should read --ink--.

COLUMN 3
Line 16, "Ink-storing" should read --ink-storing--.

COLUMN 4
Line 3, "Invention," should read --invention,--.
Line 5, "in," should read --ink,--.

COLUMN 5
Line 16, "invention:" should read --invention;--.

COLUMN 8
Line 67, "ranging" should read --ranging from--.

COLUMN 9
Line 4, "Ink" should read --ink--.
Line 36, "glycol:" (second occurrence) should read --glycol;--.

COLUMN 10
Line 40, "Ink" should read --ink--.

COLUMN 11
Line 58, "superpose" should read --superposition--.

COLUMN 12
Line 14, "Invention" should read --invention--.
Line 45, "meth(acrylamide" should read --(meth)acrylamide--.
Line 62, "amine" (first occurrence) should read --amine,--.
Line 63, "mine," should read --imine,--.

COLUMN 13
Line 9, "preferable." should be deleted.

COLUMN 14
Line 12, "denotes" should read --denote--.
Line 16, "an" should read --a--.
Line 48, "Intervals" should read --intervals--.

UNITED STATES PATENT AND TRADEMARK OFFICE
CERTIFICATE OF CORRECTION

PATENT NO. : 6,860,593 B2
APPLICATION NO. : 10/241567
DATED : March 1, 2005
INVENTOR(S) : Akio Kashiwazaki et al.

It is certified that error appears in the above-identified patent and that said Letters Patent is hereby corrected as shown below:

COLUMN 15
Line 40, "Ink" should read --ink--.

COLUMN 16
Line 1, "or" should read --or is--.
Line 3, "election" should read --ejection--.
Line 61, "inks" should read --ink--.

COLUMN 18
Line 43, "ink-repellant" should read --ink-repellant.--.

COLUMN 20
Line 42, "ink-repellant" should read --ink-repellant.--.

COLUMN 21
Line 9, "substituted" (first occurrence) should read --unsubstituted--.
Line 14, "clam 1," should read --claim 1,--.

COLUMN 24
Line 8, "medium," should read --medium, and--.

Signed and Sealed this

Eleventh Day of September, 2007

JON W. DUDAS
*Director of the United States Patent and Trademark Office*

UNITED STATES PATENT AND TRADEMARK OFFICE
CERTIFICATE OF CORRECTION

PATENT NO. : 6,860,593 B2
APPLICATION NO. : 10/241567
DATED : March 1, 2005
INVENTOR(S) : Akio Kashiwazaki et al.

It is certified that error appears in the above-identified patent and that said Letters Patent is hereby corrected as shown below:

COLUMN 1
Line 14, "Ink-jet" should read --ink-jet--.
Line 22, "Ink-jet" should read --ink-jet--.
Line 51, "Ink" should read --ink--.

COLUMN 3
Line 16, "Ink-storing" should read --ink-storing--.

COLUMN 4
Line 3, "Invention," should read --invention,--.
Line 5, "in," should read --ink,--.

COLUMN 5
Line 16, "invention:" should read --invention;--.

COLUMN 8
Line 67, "ranging" should read --ranging from--.

COLUMN 9
Line 4, "Ink" should read --ink--.
Line 36, "glycol:" (second occurrence) should read --glycol;--.

COLUMN 10
Line 40, "Ink" should read --ink--.

COLUMN 11
Line 58, "superpose" should read --superposition--.

COLUMN 12
Line 14, "Invention" should read --invention--.
Line 45, "meth(acrylamide" should read --(meth)acrylamide--.
Line 62, "amine" (first occurrence) should read --amine,--.
Line 63, "mine," should read --imine,--.

COLUMN 13
Line 9, "preferable." should be deleted.

COLUMN 14
Line 12, "denotes" should read --denote--.
Line 16, "an" should read --a--.
Line 48, "Intervals" should read --intervals--.

UNITED STATES PATENT AND TRADEMARK OFFICE
CERTIFICATE OF CORRECTION

PATENT NO. : 6,860,593 B2
APPLICATION NO. : 10/241567
DATED : March 1, 2005
INVENTOR(S) : Akio Kashiwazaki et al.

It is certified that error appears in the above-identified patent and that said Letters Patent is hereby corrected as shown below:

COLUMN 15
Line 40, "Ink" should read --ink--.

COLUMN 16
Line 1, "or" should read --or is--.
Line 3, "election" should read --ejection--.
Line 61, "inks" should read --ink--.

COLUMN 18
Line 43, "ink-repellant" should read --ink-repellant.--.

COLUMN 20
Line 42, "ink-repellant" should read --ink-repellant.--.

COLUMN 21
Line 9, "substituted" (first occurrence) should read --unsubstituted--.
Line 14, "clam 1," should read --claim 1,--.

COLUMN 24
Line 8, "medium," should read --medium, and--.

Signed and Sealed this

Eighteenth Day of September, 2007

JON W. DUDAS
*Director of the United States Patent and Trademark Office*